Sheet 1 - 2 Sheets.
L. Miller.
Mower.
No 768
Reissued Jul. 19, 1859
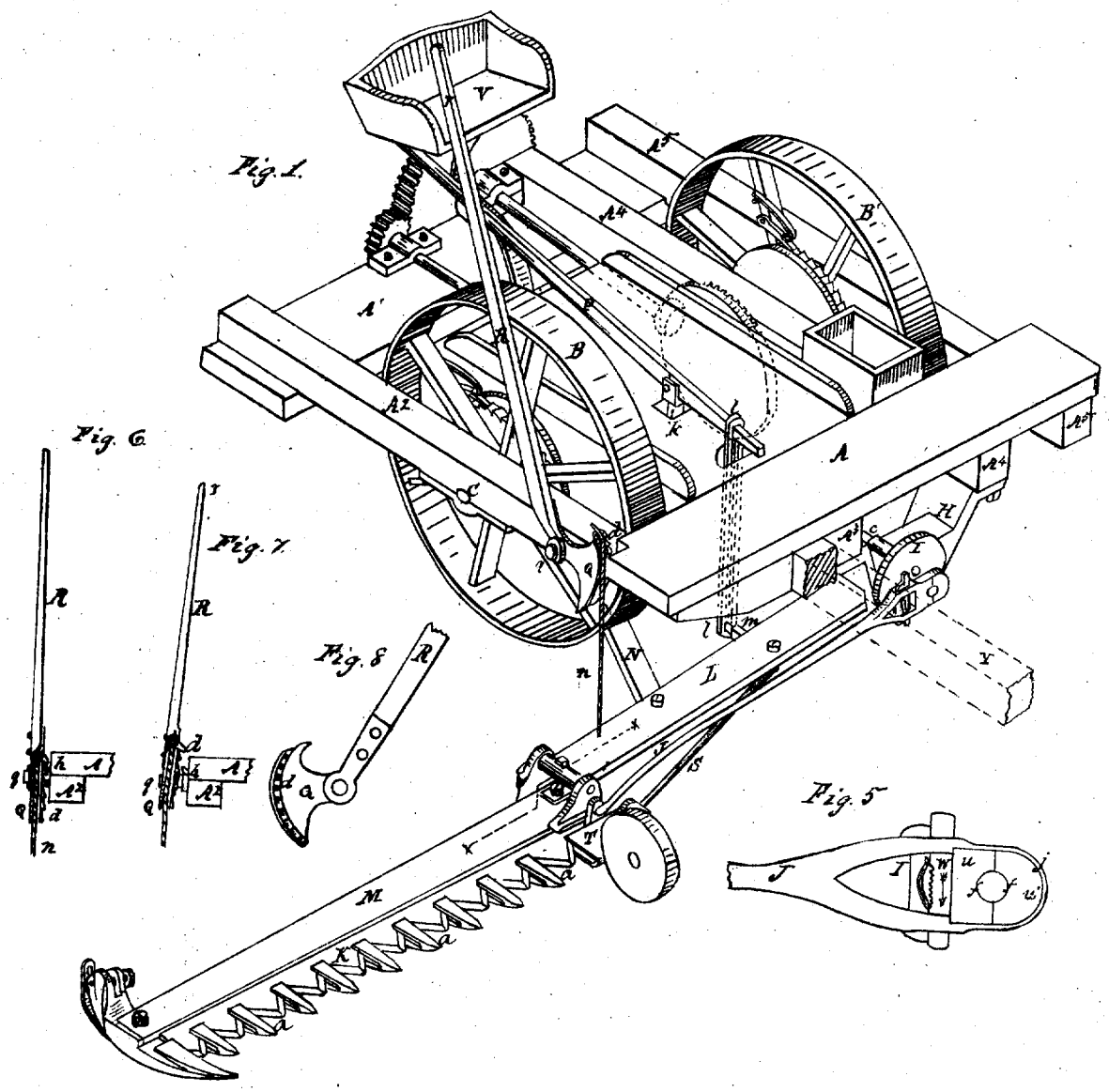

Sheet 2-2 Sheets.
L. Miller.
Mower.
No. 768
Reissued Jul. 19, 1859
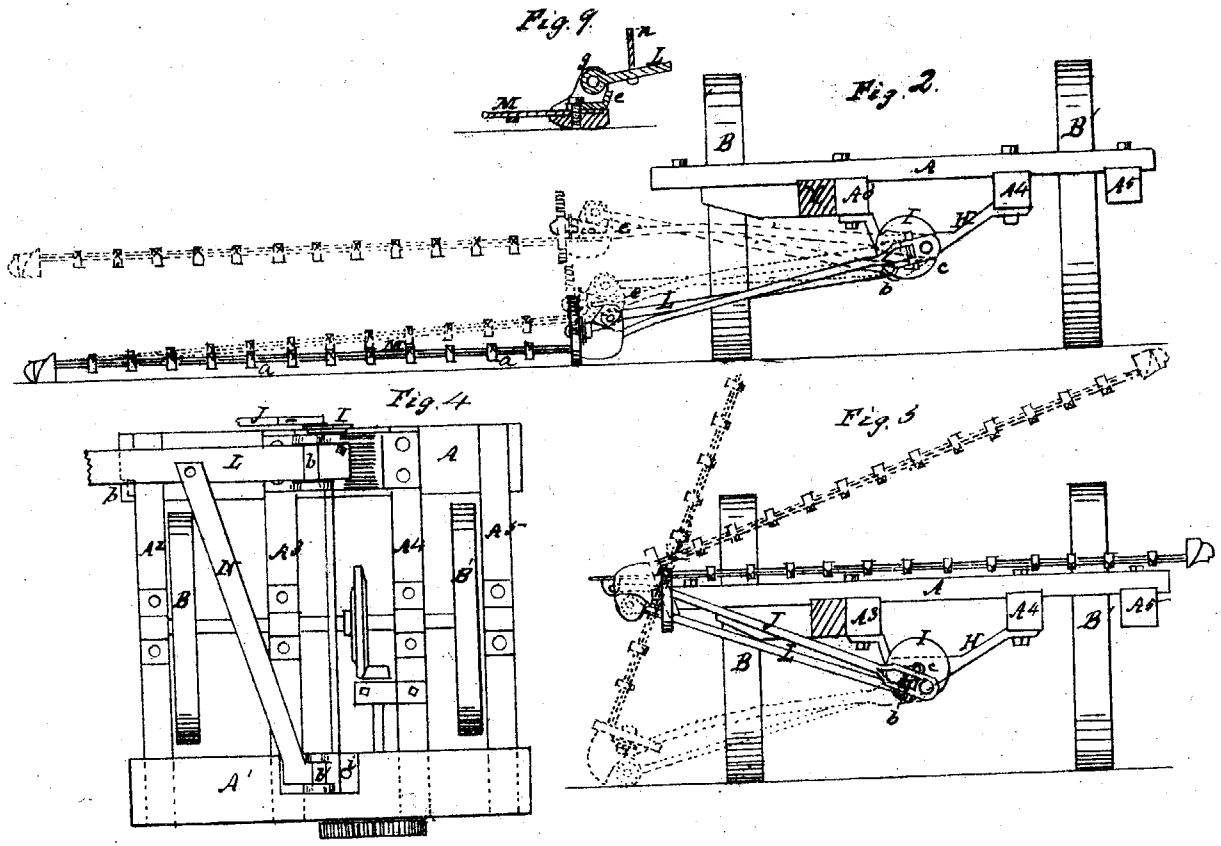

UNITED STATES PATENT OFFICE.

LEWIS MILLER, OF CANTON, OHIO, ASSIGNOR TO C. AULTMAN & CO.

IMPROVEMENT IN HARVESTERS.

Specification forming part of Letters Patent No. 20,180, dated May 4, 1858; Reissue No. 768, dated July 19, 1859.

DIVISION E.

*To all whom it may concern:*

Be it known that I, LEWIS MILLER, of Canton, in the county of Stark and State of Ohio, have invented certain new and useful Improvements in Machines for Harvesting Grain and Grass, of which the following is a full, clear, and exact description, reference being had to the accompanying drawings, which make part of this specification, and in which—

Figure 1 represents a view in perspective of the machine as arranged for mowing. Fig. 2 represents a front elevation of the machine, the black lines showing the finger-beam resting upon the ground in the position it will occupy when the machine is mowing on a level surface, the red lines showing the position of the finger-beam when mowing on an uneven surface, with its left end raised to conform thereto, and the blue lines showing the finger-beam raised off and held parallel to the ground by means of a hand-lever to pass over an obstacle. Fig. 3 represents by the black lines a front elevation of the machine with the finger-beam folded over upon the frame in a compact manner. The red lines show the finger-beam raised on end preparatory to being lifted by the hand-lever and turned over upon the frame, and the blue lines show the finger-beam almost raised up and turned over upon the frame. Fig. 4 represents a view of the under side of the main frame and certain parts connected therewith, but showing more particularly the arrangement of the brace for supporting the coupling-arm. Fig. 5 represents, on an enlarged scale, a view of one side of a portion of the connecting-rod which transmits motion from the crank to the cutter. Fig. 6 represents a front view of the quadrant-lever for lifting and the ratchet-teeth and detent for holding up the finger-beam when raised, also a fragment of the adjacent part of the frame detached from the machine. Fig. 7 represents a similar view of the same parts, the quadrant-lever and its ratchet-teeth being in the position they occupy when turned aside to disengage the teeth from the detent preparatory to raising or lowering the finger-beam. Fig. 8 represents a view of the side of the quadrant having the ratchet-teeth thereon. Fig. 9 represents a vertical section at the line *x x* of Fig. 1, showing the knuckle of the joint connecting the finger-beam and coupling-arm.

That side of the machine on which the finger-beam projects when on the ground in the position shown in Fig. 1 I call the "right" side; the other I call the "left" side.

That class of mowing-machines in which the finger-beam rests upon the ground and is free to rise and fall at both ends has many advantages, and, among others, will cut the grass with a uniformly shorter and more even stubble than those classes of machines in which the finger-beam is less free; but this class of machines has, likewise, its disadvantages in not having contrivances sufficiently convenient for raising the cutting apparatus to pass over obstacles.

To remedy this defect is the object of the invention which is claimed under this patent, and which consists—

First. In fitting the joint which connects the finger-beam and the coupling-arm with a knuckle which (when the finger-beam, at the end next the joint, has been raised above the level of the opposite end to the limit to which it is deemed expedient to allow it free play) will meet some part of the coupling-arm, so that if the arm be now raised the finger-beam will likewise be raised as if it were of one rigid piece with the coupling-arm. By this means the finger-beam can at will be raised and carried over the ground to pass obstacles by an attendant upon or at the side of the machine by simply depressing a quadrant-lever pivoted on the side of the main frame and connected with the coupling-arm. If, however, it were desired to hold the finger-beam up for any considerable length of time, the labor would be fatiguing, and, besides, would occupy the attention of the person doing it.

To avoid these difficulties, while attaining said objects, without resorting to the aid of complex mechanism is the purpose of the second branch of the invention herein claimed, which consists in so constructing and arranging the quadrant-lever that, while it is free to turn round its pivot as a fulcrum, it is likewise free to be turned a little at right angles to the axis of the pivot to engage and disengage a series of teeth or notches on its side with a fixed catch or detent on the side of the frame, the turning of the lever on its pivot being to raise and lower the cutter, and its lateral movement being to engage it with the catch to hold the coupling-arm and finger-beam suspended at any required height, and to disengage the lever from the catch whenever it is desired to lower the coupling-arm and finger-beam.

The accompanying drawings represent a mowing-machine whose main frame A $A'$ $A^2$ $A^3$ $A^4$ $A^5$ is supported by an axle, C, and a pair of wheels, B and $B'$, and whose tongue Y, by which the horses draw and guide it, projects from the front side of the main frame.

The finger-beam is hinged at its left end to the right end of a coupling-arm, the left end of which is connected by a hinge and bracket to the main frame.

Upon the upper side of the finger-beam, between the lugs which support the hinge-pin *g*, a knuckle-bar, *e*, is fastened, which projects beneath the coupling-arm to such a distance that when the joined ends of the finger-beam and coupling-arm are raised as high as it is deemed necessary for the finger-beam to be deflected upward at this end in order to conform to irregularities of the surface of the ground, the knuckle will meet the under side of the coupling-arm, as shown by the red lines in Fig. 2, and consequently any further raising of the coupling-arm will be accompanied by a corresponding rising of the finger-beam, as if the two were in one rigid piece, as shown by the blue lines in Fig. 2. By means of this device the finger-beam may be raised to carry it over obstructions without interfering with its freedom to rise and fall at either or both ends to a sufficient extent to enable it to conform to the inequalities of surface of any ground suitable for being mowed by a machine.

On the side of the beam $A^2$ of the frame a quadrant, Q, is supported on a pivot, *q*, and fitted with a hand-lever, R. The front edge or periphery of the quadrant is grooved to receive and guide a cord or strap, *n*, fastened by one end to the upper corner of the quadrant and by the other end to the coupling-arm L. When the lever R is depressed the quadrant turns, and, winding up the cord *n*, raises the coupling-arm, and as soon as the knuckle of the finger-beam comes into contact with the arm the beam is also raised. When the beam is raised as high as required it is desirable that it should be there held as long as necessary by the machine itself; and to accomplish this end the quadrant is provided on its left side, which is next the frame, with a series of ratchet-teeth, *d*, and it is fixed so loosely upon its pivot that it is capable of being turned laterally thereon to the right or left, so as to engage and disengage the teeth on its side with a catch, *p*, on the side of the frame. The catch *p* is turned upward and the teeth *d* are turned downward, that they may hook together sufficiently to prevent the jolting of the machine from disengaging them. The upper tooth is long enough to prevent it from passing the catch. This construction and arrangement of the quadrant and catch are more fully shown in Figs. 6, 7, and 8. The handle *r* of the quadrant-lever is so arranged that it extends within convenient reach of the driver on the seat V of the machine, so that it may readily be raised or depressed by him with one hand, while driving with the other.

What I claim under this patent as my invention is—

1. The combination of a knuckle with the joint which connects the finger-beam and coupling-arm and the lever for raising the finger-beam off the ground, the several parts being constructed and arranged as set forth.

2. The combination of a lever arranged to turn on a pivot and to vibrate laterally, with notches and a catch to support the lever at any required elevation, together with the coupling-arm and finger-beam suspended to it, substantially as herein set forth.

In testimony whereof I have hereunto subscribed my name.

LEWIS MILLER.

Witnesses:
N. WALKER,
JAS. S. SONNER.